(12) United States Patent
James

(10) Patent No.: US 10,857,936 B2
(45) Date of Patent: Dec. 8, 2020

(54) U-TURN SIGNAL SYSTEM AND KIT

(71) Applicant: Katherine James, N. Las Vegas, NV (US)

(72) Inventor: Katherine James, N. Las Vegas, NV (US)

( * ) Notice: Subject to any disclaimer, the term of this patent is extended or adjusted under 35 U.S.C. 154(b) by 0 days.

(21) Appl. No.: 16/750,061

(22) Filed: Jan. 23, 2020

(65) Prior Publication Data

US 2020/0238898 A1 Jul. 30, 2020

Related U.S. Application Data

(60) Provisional application No. 62/918,315, filed on Jan. 25, 2019.

(51) Int. Cl.
| | | |
|---|---|---|
| *B60Q 1/26* | (2006.01) | |
| *B60Q 1/34* | (2006.01) | |
| *F21V 23/04* | (2006.01) | |
| *F21W 103/20* | (2018.01) | |
| *B60R 16/033* | (2006.01) | |
| *F21Y 115/10* | (2016.01) | |

(52) U.S. Cl.
CPC .......... *B60Q 1/343* (2013.01); *B60Q 1/2603* (2013.01); *B60Q 1/2696* (2013.01); *F21V 23/0435* (2013.01); *B60Q 1/2615* (2013.01); *B60Q 2900/30* (2013.01); *B60R 16/033* (2013.01); *F21W 2103/20* (2018.01); *F21Y 2115/10* (2016.08)

(58) Field of Classification Search
CPC .................................. B60Q 1/50; B60Q 1/34
See application file for complete search history.

(56) References Cited

U.S. PATENT DOCUMENTS

| | | | |
|---|---|---|---|
| 5,663,708 A | 9/1997 | Strawn | |
| 6,195,001 B1 * | 2/2001 | Haddad | B60Q 1/34 340/465 |
| 6,958,687 B1 | 10/2005 | Smith | |
| 7,167,086 B1 | 1/2007 | Goins | |
| 7,245,209 B2 * | 7/2007 | Sanicola | B60Q 1/50 340/465 |
| 7,417,534 B2 * | 8/2008 | Quach | B60Q 1/34 340/468 |
| 8,519,840 B1 | 8/2013 | Banks | |
| 2006/0267752 A1 * | 11/2006 | Crunk | B60Q 1/2696 340/479 |
| 2007/0069881 A1 * | 3/2007 | Dohan | B60Q 1/34 340/465 |
| 2014/0091920 A1 * | 4/2014 | Thompson | B60Q 1/38 340/475 |
| 2016/0229336 A1 * | 8/2016 | Ali | B60Q 1/34 |
| 2019/0277471 A1 * | 9/2019 | Christian | B60Q 1/2696 |

* cited by examiner

*Primary Examiner* — Matthew J. Peerce

(57) ABSTRACT

A U-turn signal system; the U-turn signal system includes an exterior-vehicle illuminating U-Turn signal assembly, an interior-vehicle illuminating U-Turn signal assembly, and an activation device having a radio frequency transmitter in wireless communication with the exterior-vehicle illuminating U-Turn signal assembly and the interior-vehicle illuminating U-Turn signal assembly each having radio frequency receivers. The U-turn signal system may be installed on a host-vehicle and provides means for indicating an intent to make a U-turn.

17 Claims, 5 Drawing Sheets

U-TURN SIGNAL SYSTEM AND KIT

CROSS-REFERENCE TO RELATED APPLICATION(S)

The present application is related to and claims priority to U.S. Provisional Patent Application No. 62/918,315 filed Jan. 25, 2019, which is incorporated by reference herein in its entirety.

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

TECHNICAL FIELD

The present invention relates generally to the field of vehicle accessories of existing art and more specifically relates to lights for motor vehicles.

RELATED ART

Many motor vehicle accidents are caused by drivers making U-turns. Standard turn signals can misinform drivers in perpendicular alignment to a U-turning vehicle of the U-turning vehicle's intentions, thus prompting the drivers to assume it's safe to conduct a right turn which in actuality poses an accident risk. A suitable solution is desired.

U.S. Pat. No. 7,417,534 to Tuan Kim Quach relates to a U-turn signal device for motor vehicles. The described U-turn signal device for motor vehicles includes an LED array, and an integrated circuit control circuit which produces LED activation control signals. These control signals activate the LED array to produce at least three modes of activity including a tail light mode, a turn mode and a U-turn mode in response to activation signals from the tail light, turn signal and U-turn signal respectively. The LED array can be a portable LED array, an embedded LED array or a double-sided LED array. The LED array is a preferably a combo LED array and further includes a monitor screen, which may be mounted in the dashboard of the vehicle, and may include a multi-position turn signal switch. Also disclosed is a flexible U-turn signal device, which may be activated by a wireless remote control switch.

SUMMARY OF THE INVENTION

In view of the foregoing disadvantages inherent in the known lights for motor vehicles art, the present disclosure provides a novel U-turn signal system. The general purpose of the present disclosure, which will be described subsequently in greater detail, is to provide a device which visually indicates when a driver of a motor vehicle is going to perform a U-turn and discerns between a left turn and a U-turn. The U-turn signal system fulfills a long-standing need in traffic safety and convenience.

A U-turn signal system is disclosed herein. The U-turn signal system includes an exterior-vehicle illuminating U-Turn signal assembly having a plurality of lights arranged in a U-turn arrow icon which is configured to emit light when activated, an interior-vehicle illuminating U-Turn signal assembly having a plurality of lights arranged in a U-turn arrow icon which is configured to emit light when activated, and an activation device having radio frequency transmitter in wireless communication with the exterior-vehicle illuminating U-Turn signal assembly and the interior-vehicle illuminating U-Turn signal assembly each having radio frequency receivers. The plurality of lights and the radio frequency receivers of the exterior-vehicle illuminating U-Turn signal assembly and the plurality of lights and the radio frequency receivers of the interior-vehicle illuminating U-Turn signal assembly are preferably battery powered. The exterior-vehicle illuminating U-Turn signal assembly is configured to be secured to an exterior front-side of a host-vehicle, the interior-vehicle illuminating U-Turn signal assembly is configured to be mounted on an interior rear-portion of the host vehicle, and the activation device is configured to be installed in a position proximal to a driver in order to activate the exterior-vehicle illuminating U-Turn signal assembly and the interior-vehicle illuminating U-Turn signal assembly as to indicate intention of the driver to conduct a U-turn.

A kit is further disclosed including two illuminating U-Turn Signal assemblies and an activation button which may be installed upon and within automobiles, and used by the driver to signal their intention to conduct a U-Turn.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, a U-turn signal system, constructed and operative according to the teachings of the present disclosure.

The various embodiments of the present invention will hereinafter be described in conjunction with the appended drawings, wherein like designations denote like elements.

DETAILED DESCRIPTION

Figure 1:
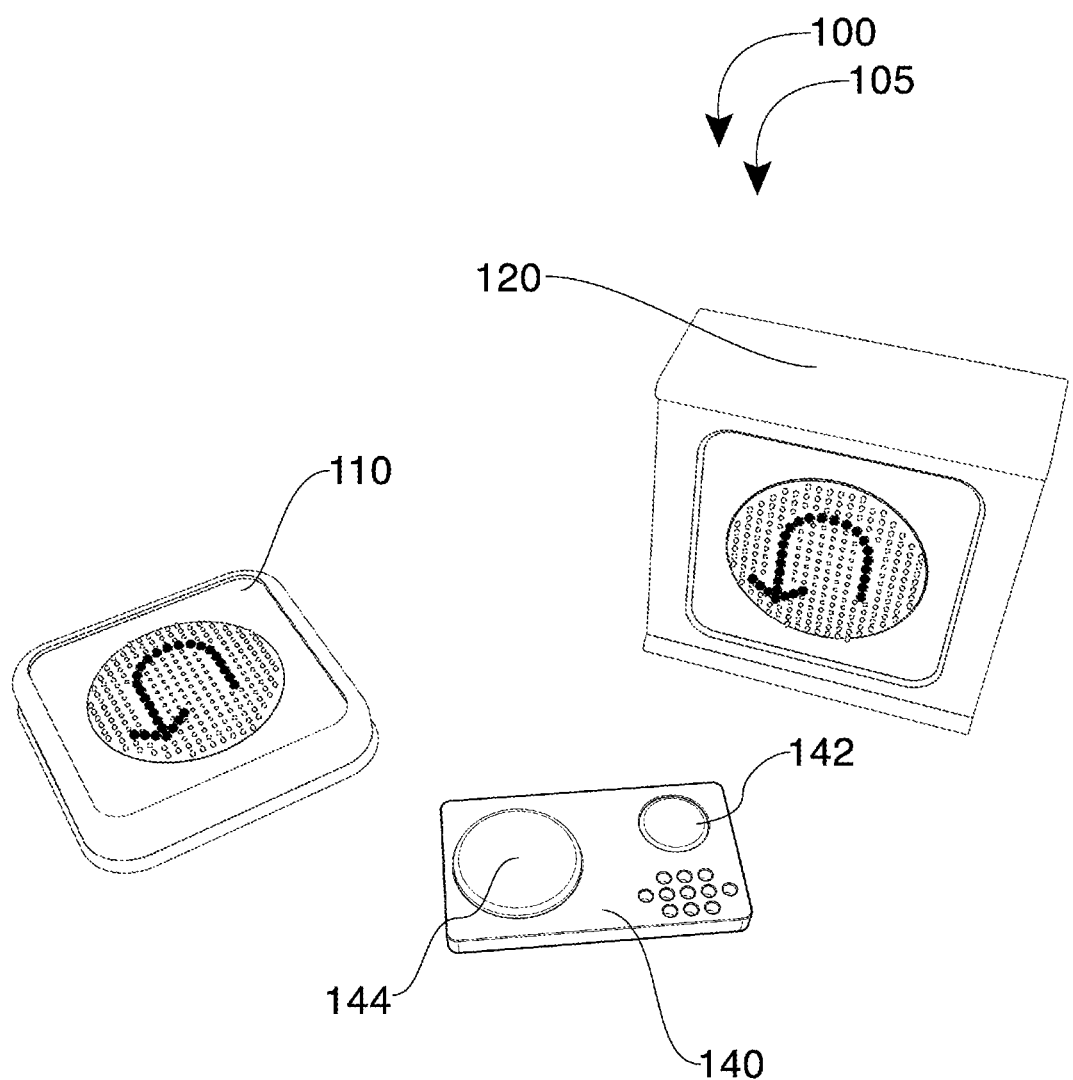
FIG. 1 is a perspective view of the U-turn signal system, according to an embodiment of the disclosure.

As discussed above, embodiments of the present disclosure relate to lights for motor vehicles and more particularly to a U-turn signal system as used to improve the indication of an intent to make a U-turn, the system warns drivers behind and in perpendicular alignment to a U-turning vehicle not to turn into the path of the U-turning vehicle.

Generally, the U-turn signal system is a lighting mechanism for attachment to and use with a motor vehicle, which notifies others of the U-turn intentions of the hosting vehicle's driver, thereby preventing a common cause of traffic accidents. The U-turn signal system comprises of an exterior-vehicle illuminating U-Turn signal assembly, an interior-vehicle illuminating U-Turn signal assembly, and a push-button activation device. The exterior-vehicle illuminating U-Turn signal assembly and the interior-vehicle illuminating U-Turn signal assembly feature RF receivers in the interior of their frame. Each U-Turn signal assembly features a field of bright red LEDs that boldly illuminate (no flash) when the device is activated. Within the center of the red LEDs are several Amber LEDs positioned to form a U-Turn Icon within that red field. When activated these Amber LEDs brightly flash and illuminate the U-Turn Icon with each flash.

The U-Turn assembly for the exterior of the vehicle features a thick, pliable rubber rear plane. This rubber rear plane allows the assembly to conform to the slight curves and ridges of an automobiles exterior surface. The rear plane of this lighting piece is sealed by a pliant rubber sheet of closed-cell compression in an approximate half-inch (½") depth. Upon the rear plane of the exterior U-Turn assembly is a strong, weather-resistant, pressure-sensitive adhesive with a low-residue factor, and this adhesive is protected by a wax paper. This adhesive allows the assembly to bond with the surface of the automobile and provide a stable and secure hold. The exterior U-Turn assembly features a rearward projecting flange. This flange ensures the user pushes the product firmly against the vehicle, so the adhesive can set, and it also provides aerodynamics to the assembly. This ensures the air moves over the assembly without disturbing its placement. The exterior U-Turn assembly measures approximately 4"×4"×½" and may be placed on a driver's-side fender near a headlamp of a vehicle. Further, the exterior U-Turn assembly includes accessible battery in the interior of the frame.

The interior U-Turn assembly may be positioned with its lens facing out the rear window, and secured upon the rear dash or upon the ceiling of the vehicle. It can be secured in place via hook-and-loop, brackets, or other means. The interior U-Turn assembly measures approximately 4"×4"×2" and includes an accessible battery in the interior of the frame.

The Activation Button features a speaker that broadcasts a beeping sound when the U-Turn signals are activated. This sound is to remind the driver to turn off the U-Turn assembly once the U-Turn is completed. The Activation Button features a small LED that illuminates to inform the user the batteries of the device are strong. When the LED flashes the user knows it's time to change or charge the batteries. When the LED is extinguished the owners knows the batteries are dead and the device isn't functioning. The activation button features a RF transmitter and the U-Turn assemblies feature RF receivers and in order to communicate with each other regarding turning the LEDs on and off as well as battery life. Both the first and second lighting pieces have radio frequency receivers, which are connected by wire to the light-emitting diodes (LEDs), and batteries power these receivers and light-emitting diodes (LEDs). The radio frequency receivers of each lighting piece are in megahertz (MHz) alignment to a transmitter. The transmitter is contained within housing that includes a battery, a power-indicating light, and an audio speaker that broadcasts when the light-emitting diodes (LEDs) are activated. A power button operates these elements of the transmitter. The lighting pieces and activator of the U-turn signal system may communicate by various means, such as but not limited to radio frequency and wireless telecommunication such as Bluetooth™.

The lighting pieces of the U-turn signal system can be produced in various sizes and shapes. The U-turn signal system may use various designs of U-turn symbols. The U-turn signal system may broadcast its U-turn symbols in various colors, with various patterns of display, and with various timing of display. The U-turn signal system can use various means of attachment of its lighting pieces to a hosting vehicle, including but not limited to pressure-sensitive adhesive (PSA), magnetic linings, metal and/or plastic fasteners, and hook-and-loop material. The U-turn signal system may broadcast in frequencies of various megahertz.

After applying the U-turn signal system to a motor vehicle, the user may simply activate it whenever he or she approaches a U-turn need while driving. Upon depressing the power button of the transmitter, said transmitter will broadcast signal to the lighting units, each of which will begin to display their red lighting continuously, while the amber U-turn symbol flashes. Throughout this activation, an indicator light on the transmitter as well as its audio speaker will broadcast. Upon completion of the U-turn, the user may simply turn off the U-turn signal system by depressing its power button.

Referring now more specifically to the drawings by numerals of reference, there is shown in FIGS. 1-5, various views of a U-turn signal system 100.

FIG. 1 shows a U-turn signal system 100 according to an embodiment of the present disclosure. Here, the U-turn signal system 100 may be beneficial for use by a user to visually indicate and notify other drivers or pedestrians of the intent to make a U-turn. As illustrated, the U-turn signal system 100 may include an exterior-vehicle illuminating U-Turn signal assembly 110 having a plurality of lights 112 arranged in a U-turn arrow icon which is configured to emit light when activated, an interior-vehicle illuminating U-Turn signal assembly 120 having a plurality of lights 112 arranged in a U-turn arrow icon which is configured to emit light when activated, and an activation device 140 having radio frequency transmitter in wireless communication with the exterior-vehicle illuminating U-Turn signal assembly 110 and the interior-vehicle illuminating U-Turn signal assembly 120 each having radio frequency receivers. The plurality of lights 112 and the radio frequency receivers of the exterior-vehicle illuminating U-Turn signal assembly 110 and the plurality of lights 112 and the radio frequency receivers of the interior-vehicle illuminating U-Turn signal assembly 120 are preferably battery powered. The battery source may be rechargeable or non-rechargeable batteries 10. Other suitable powering means may be used. The exterior-vehicle illuminating U-Turn signal assembly 110 is configured to be secured to an exterior front-side of a host-vehicle 20, the interior-vehicle illuminating U-Turn signal assembly 120 is configured to be mounted on an interior rear-portion of the host-vehicle 20, and the activation device 140 is configured to be installed in a position proximal to a driver in order to activate the exterior-vehicle illuminating U-Turn signal assembly 110 and the interior-vehicle illuminating U-Turn signal assembly 120 as to indicate intention of the driver to conduct a U-turn. By warning drivers in perpendicular alignment to a U-turning vehicle not to turn right, the U-turn signal system eliminates the spatial conflict that the drivers may ordinarily have as both attempt to complete their turns simultaneously.

A front plane 114 of the exterior-vehicle illuminating U-Turn signal assembly 110 and a front plane 122 of the interior-vehicle illuminating U-Turn signal assembly 120 each comprise respective plurality of lights 112 arranged in the U-turn arrow icon. Each of the plurality of lights 112 arranged in the U-turn arrow icon comprise light-emitting diode lights. The light-emitting diode lights include a field of bright red light-emitting diode lights that illuminate and a series of amber light-emitting diode lights positioned within the field of bright red light-emitting diode lights to form the U-turn arrow icon.

According to one embodiment, the U-turn signal system 100 may be arranged as a kit 105. In particular, the U-turn signal system 100 may further include a set of instructions 107. The instructions 107 may detail functional relationships in relation to the structure of the U-turn signal system 100 such that the U-turn signal system 100 can be used, maintained, or the like, in a preferred manner.

Figure 2:
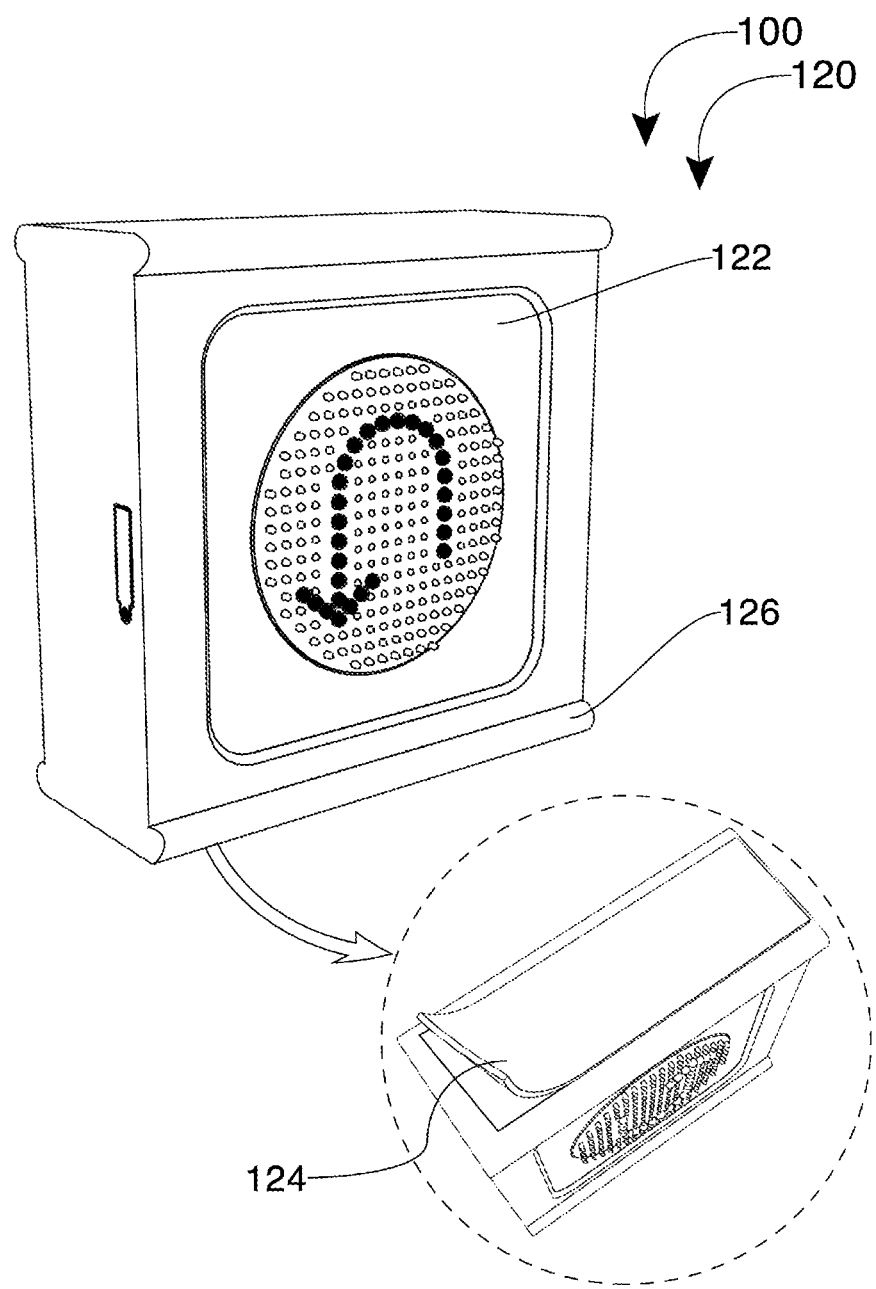
FIG. 2 is a front perspective view of an interior-vehicle illuminating U-Turn signal assembly of the U-turn signal system of FIG. 1, according to an embodiment of the present disclosure.

FIG. 2 shows the U-turn signal system 100 of FIG. 1, according to an embodiment of the present disclosure. As above, the U-turn signal system 100 may include the exterior-vehicle illuminating U-Turn signal assembly 110, the interior-vehicle illuminating U-Turn signal assembly 120 and the activation device 140. As shown in FIG. 2, the interior-vehicle illuminating U-Turn signal assembly 120 includes a plurality of lights 112 arranged in a U-turn arrow icon. The interior-vehicle illuminating U-Turn signal assembly 120 comprises an interior-fastener 124 positioned on a base-portion 126 of the interior-vehicle illuminating U-Turn signal assembly 120. The interior-vehicle illuminating U-Turn signal assembly 120 may be positioned with the plurality of lights 112 facing out a rear window of a host-vehicle 20, and secured upon the rear dash or upon the ceiling of the host-vehicle 20. The radio frequency receivers of the exterior-vehicle illuminating U-Turn signal assembly 110 and the interior-vehicle illuminating U-Turn signal assembly 120 are connected by wire to respective the light emitting diodes and a battery 10 power source.

Figure 3:
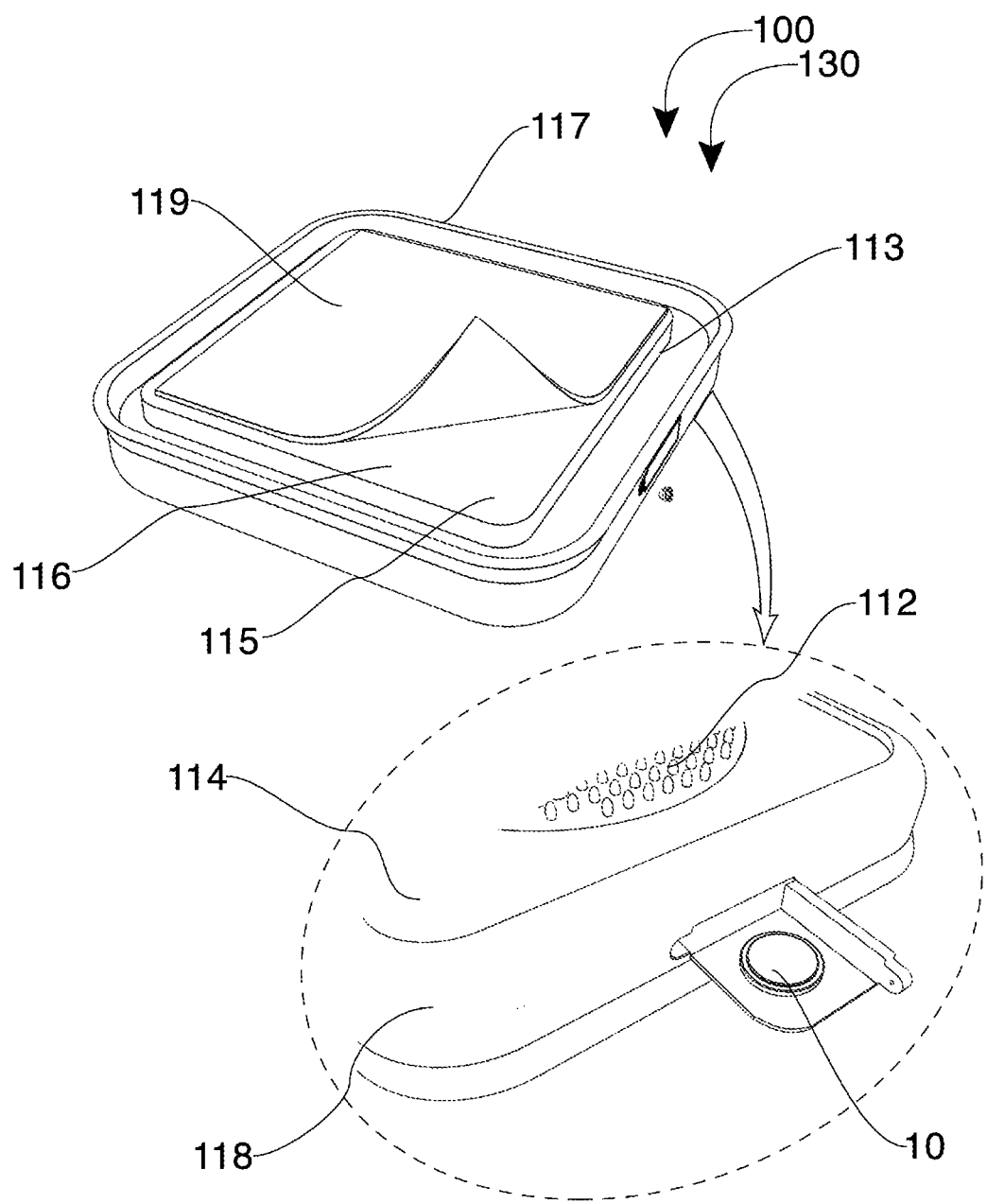
FIG. 3 is a rear perspective view of an exterior-vehicle illuminating U-Turn signal assembly of the U-turn signal system of FIG. 1, according to an embodiment of the present disclosure.

FIG. 3 is a rear perspective view of the exterior-vehicle illuminating U-Turn signal assembly 110 of the U-turn signal system 100 of FIG. 1, according to an embodiment of the present disclosure. The exterior-vehicle illuminating U-Turn signal assembly 110 is configured to be secured to the exterior front-side of the host-vehicle 20 via a fastener 115. The fastener 115 may include a weather-resistant, pressure-sensitive adhesive 116. The fastener 115 is positioned on a rear plane 113 of the exterior-vehicle illuminating U-Turn signal assembly 110. The rear plane 113 of the exterior-vehicle illuminating U-Turn signal assembly 110 is pliable and configured to contour and adhere to the exterior front-side of the host-vehicle 20. The exterior-vehicle illuminating U-Turn signal assembly 110 further includes a pliant border 117. The exterior-vehicle illuminating U-Turn signal assembly 110 includes a concave cover plate 118 made of translucent plastic material, covers the plurality of lights 112. The fastener of the exterior-vehicle illuminating U-Turn signal assembly 110 is covered with a removeable covering 119 before installation. The exterior-vehicle illuminating U-Turn signal assembly 110 further comprises a rearward projecting flange.

Figure 4:
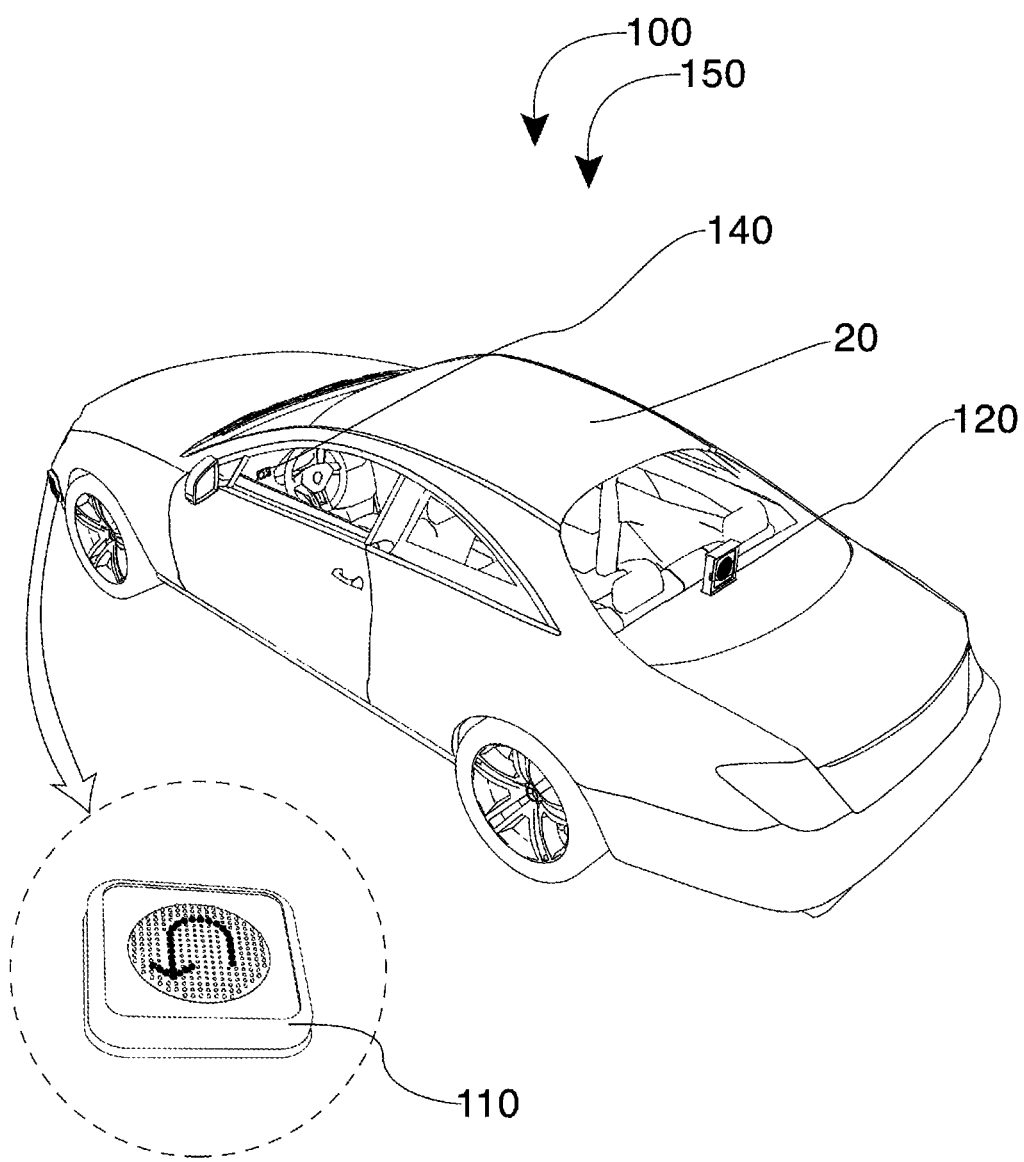
FIG. 4 is a rear perspective view of the U-turn signal system during an installed condition, according to an embodiment of the disclosure.

FIG. 4 is the rear perspective of the U-turn signal system 100 during an installed condition 150, according to an embodiment of the present disclosure. In alternative embodiments of the U-Turn signal system 100, the system 100 is made in formats in which its components are directly wired to the hosting vehicle, and thus need no telecommunication components. Additionally, the U-turn signal system 100 may be made in formats intended for permanent aftermarket mounting on a vehicle or included in manufacturing of motor vehicles. In yet another embodiment, the system 100 includes either the exterior-vehicle illuminating U-Turn signal assembly 110 or the interior-vehicle illuminating U-Turn signal assembly 120 provided with the activation device 140.

Figure 5:
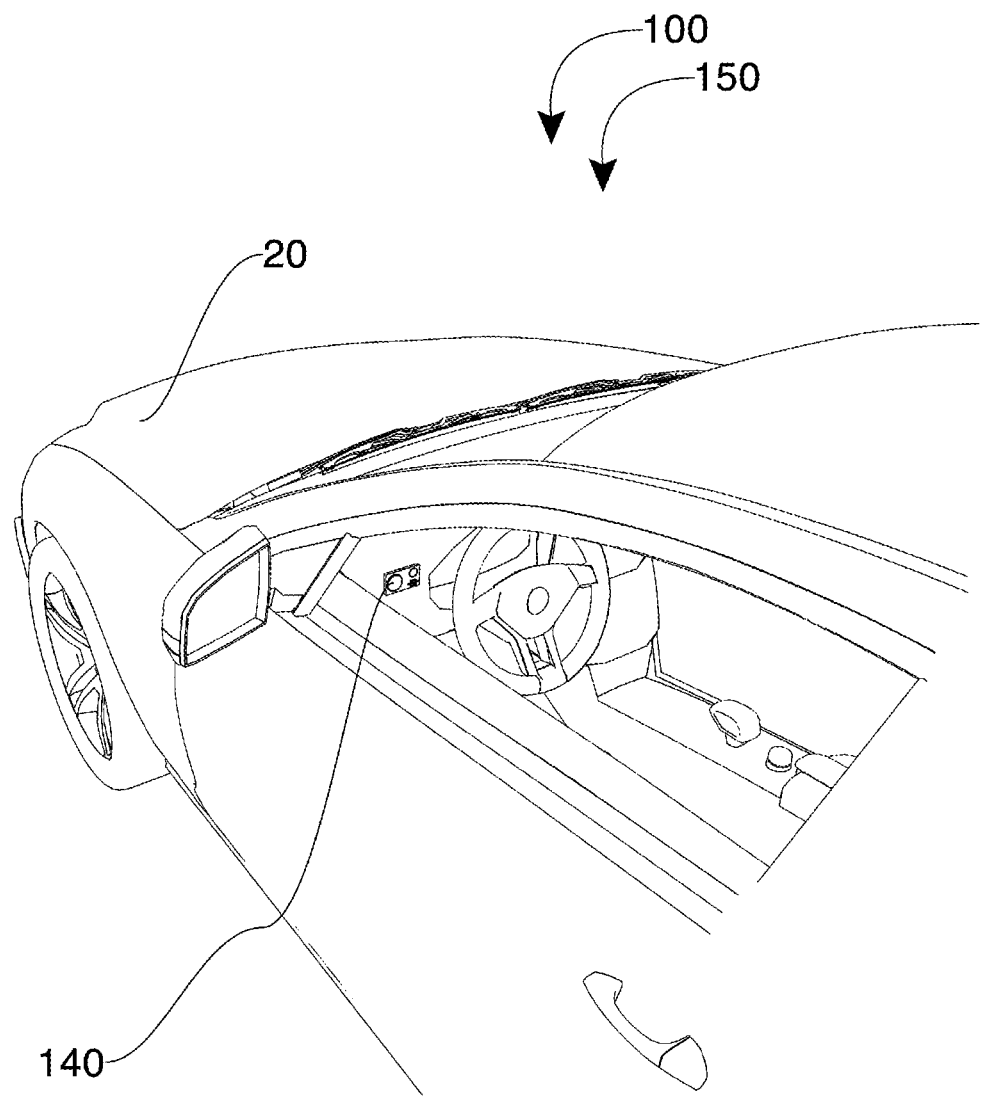
FIG. 5 is a side perspective view of the U-turn signal system during an 'in-use' condition, according to an embodiment of the disclosure.

FIG. 5 shows the side perspective of the U-turn signal system 100 during an 'in-use' condition 150, according to an embodiment of the present disclosure. In FIG. 5, the activation device 140 is mounted to a dashboard allowing for convenient access for a driver. The activation device 140 includes a push-button 142 configured to active the exterior-vehicle illuminating U-Turn signal assembly 110 and the interior-vehicle illuminating U-Turn signal assembly 120. The activation device 140 features a speaker 144 for audio output such as a beeping sound to indicate the U-turn signal system is activated. Once a U-turn has been completed, the beeping sound stops. The audio output is transmitted when the push-button of the activation device 140 is depressed. The audio output of the U-turn signal system may be of various tones, patterns, and volumes, and the volume may or may not be controllable by the user. The activation device 140 further comprises a battery life indicator to indicate and monitor battery life.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A U-turn signal system, the U-turn signal system comprising:
   an exterior-vehicle illuminating U-Turn signal assembly having a plurality of lights arranged in a U-turn arrow icon which is configured to emit light when activated;
   an interior-vehicle illuminating U-Turn signal assembly having a plurality of lights arranged in a U-turn arrow icon which is configured to emit light when activated, and
   an activation device having radio frequency transmitter in wireless communication with said exterior-vehicle illuminating U-Turn signal assembly and said interior-vehicle illuminating U-Turn signal assembly each having radio frequency receivers;
   wherein said plurality of lights and said radio frequency receivers of said exterior-vehicle illuminating U-Turn signal assembly and said plurality of lights and said radio frequency receivers of said interior-vehicle illuminating U-Turn signal assembly are battery powered;
   wherein said exterior-vehicle illuminating U-Turn signal assembly is configured to be secured to an exterior front-side of a host-vehicle, said interior-vehicle illuminating U-Turn signal assembly is configured to be mounted on an interior rear-portion of said host vehicle, and said activation device is configured to be installed in a position proximal to a driver in order to activate said exterior-vehicle illuminating U-Turn signal assembly and said interior-vehicle illuminating U-Turn signal assembly as to indicate intention of said driver to conduct a U-turn;

wherein a front plane of said exterior-vehicle illuminating U-turn signal assembly and a front plane of said interior vehicle illuminating U-turn signal assembly each comprise respective said plurality of lights arranged in said U-turn arrow icon;

wherein said exterior vehicle illuminating U-turn signal assembly includes a concave cover plate and a pliant border.

2. The U-turn signal system of claim 1, wherein said activation device includes a push-button configured to active said exterior-vehicle illuminating U-Turn signal assembly and said interior-vehicle illuminating U-Turn signal assembly.

3. The U-turn signal system of claim 2, wherein said activation device further includes a speaker for audio output, said audio output is transmitted when said push-button of said activation device is depressed.

4. The U-turn signal system of claim 1, wherein said exterior-vehicle illuminating U-Turn signal assembly is configured to be secured to said exterior front-side of said host-vehicle via a fastener, said fastener comprises a weather-resistant, pressure-sensitive adhesive.

5. The U-turn signal system of claim 4, wherein said fastener is positioned on a rear plane of said exterior-vehicle illuminating U-Turn signal assembly.

6. The U-turn signal system of claim 5, wherein said rear plane of said exterior-vehicle illuminating U-Turn signal assembly is pliable and configured to contour to said exterior front-side of said host-vehicle.

7. The U-turn signal system of claim 1, wherein each of said plurality of lights arranged in said U-turn arrow icon comprise light-emitting diode lights.

8. The U-turn signal system of claim 7, wherein said light-emitting diode lights include a field of bright red light-emitting diode lights that illuminate and a series of amber light-emitting diode lights positioned within said field of bright red light-emitting diode lights to form said U-turn arrow icon.

9. The U-turn signal system of claim 5, wherein said fastener of said exterior-vehicle illuminating U-Turn signal assembly is covered with a removeable covering before installation.

10. The U-turn signal system of claim 3, wherein said activation device further comprises a battery life indicator.

11. The U-turn signal system of claim 1, wherein said interior-vehicle illuminating U-Turn signal assembly comprises an interior-fastener.

12. The U-turn signal system of claim 11, wherein said interior-fastener is positioned on a base-portion of said interior-vehicle illuminating U-Turn signal assembly.

13. The U-turn signal system of claim 1, wherein said radio frequency receivers of said exterior-vehicle illuminating U-Turn signal assembly and said interior-vehicle illuminating U-Turn signal assembly are connected by wire to respective said light emitting diodes and a battery power source.

14. The U-turn signal system of claim 1, wherein said exterior-vehicle illuminating U-Turn signal assembly further comprises a rearward projecting flange.

15. The U-turn signal system of claim 1, wherein said activation device is mountable to a dashboard.

16. A U-turn signal system, the U-turn signal system comprising:

an exterior-vehicle illuminating U-Turn signal assembly having a plurality of lights arranged in a U-turn arrow icon which is configured to emit light when activated;

an interior-vehicle illuminating U-Turn signal assembly having a plurality of lights arranged in a U-turn arrow icon which is configured to emit light when activated, and an activation device having radio frequency transmitter in wireless communication with said exterior-vehicle illuminating U-Turn signal assembly and said interior-vehicle illuminating U-Turn signal assembly each having radio frequency receivers;

wherein said plurality of lights and said radio frequency receivers of said exterior-vehicle illuminating U-Turn signal assembly and said plurality of lights and said radio frequency receivers of said interior-vehicle illuminating U-Turn signal assembly are battery powered;

wherein said exterior-vehicle illuminating U-Turn signal assembly is configured to be secured to an exterior front-side of a host-vehicle, said interior-vehicle illuminating U-Turn signal assembly is configured to be mounted on an interior rear-portion of said host vehicle, and said activation device is configured to be installed in a position proximal to a driver in order to activate said exterior-vehicle illuminating U-Turn signal assembly and said interior-vehicle illuminating U-Turn signal assembly as to indicate intention of said driver to conduct a U-turn;

wherein said activation device includes a push-button configured to active said exterior-vehicle illuminating U-Turn signal assembly and said interior-vehicle illuminating U-Turn signal assembly;

wherein said activation device further includes a speaker for audio output, said audio output is transmitted when said push-button of said activation device is depressed;

wherein said activation device further comprises a battery life indicator;

wherein said exterior-vehicle illuminating U-Turn signal assembly is configured to be secured to said exterior front-side of said host-vehicle via a fastener, said fastener comprises a weather-resistant, pressure-sensitive adhesive;

wherein said fastener is positioned on a rear plane of said exterior-vehicle illuminating U-Turn signal assembly;

wherein said rear plane of said exterior-vehicle illuminating U-Turn signal assembly is pliable and configured to contour to said exterior front-side of said host-vehicle;

wherein a front plane of said exterior-vehicle illuminating U-Turn signal assembly and a front plane of said interior-vehicle illuminating U-Turn signal assembly each comprise respective said plurality of lights arranged in said U-turn arrow icon;

wherein each of said plurality of lights arranged in said U-turn arrow icon comprise light-emitting diode lights;

wherein said light-emitting diode lights include a field of bright red light-emitting diode lights that illuminate and a series of amber light-emitting diode lights positioned within said field of bright red light-emitting diode lights to form said U-turn arrow icon;

wherein said exterior-vehicle illuminating U-Turn signal assembly includes a concave cover plate;

wherein said exterior-vehicle illuminating U-Turn signal assembly further includes a pliant border;

wherein said fastener of said exterior-vehicle illuminating U-Turn signal assembly is covered with a removeable covering before installation;

wherein said interior-vehicle illuminating U-Turn signal assembly comprises an interior-fastener;

wherein said interior-fastener is positioned on a base-portion of said interior-vehicle illuminating U-Turn signal assembly;

wherein said radio frequency receivers of said exterior-vehicle illuminating U-Turn signal assembly and said interior-vehicle illuminating U-Turn signal assembly are connected by wire to respective said light emitting diodes and a battery power source; and wherein said activation device is mountable to a dashboard.

17. The U-turn signal system of claim 16, further comprising set of instructions; and wherein the U-turn signal system is arranged as a kit.

* * * * *